(12) United States Patent
Govindasamy et al.

(10) Patent No.: US 10,719,959 B2
(45) Date of Patent: Jul. 21, 2020

(54) MOBILE DEVICE AND A METHOD FOR TEXTURE MEMORY OPTIMIZATION THEREOF

(71) Applicant: SAMSUNG ELECTRONICS CO., LTD., Suwon-si (KR)

(72) Inventors: Sakthivel Govindasamy, Bangalore (IN); Swantantra Jaiswal, Bangalore (IN); Rahul Upadhyay, Bangalore (IN); Atul Dharwal, Bangalore (IN); Rohit Rao Padebettu, Bangalore (IN); Sang-ik Bang, Seoul (KR); Ajay Surendranath, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/070,170

(22) PCT Filed: Jan. 16, 2017

(86) PCT No.: PCT/KR2017/000516
§ 371 (c)(1),
(2) Date: Jul. 13, 2018

(87) PCT Pub. No.: WO2017/123071
PCT Pub. Date: Jul. 20, 2017

(65) Prior Publication Data
US 2019/0019316 A1     Jan. 17, 2019

(30) Foreign Application Priority Data

Jan. 14, 2016   (IN) .............................. 201641001496
Apr. 13, 2016   (IN) .............................. 201641013011
(Continued)

(51) Int. Cl.
*G06T 11/00*     (2006.01)
*G06T 1/60*      (2006.01)
(Continued)

(52) U.S. Cl.
CPC .............. *G06T 11/001* (2013.01); *G06T 1/20* (2013.01); *G06T 1/60* (2013.01); *G06T 3/40* (2013.01);
(Continued)

(58) Field of Classification Search
CPC . G06T 11/001; G06T 1/20; G06T 3/40; G06T 1/60; G06T 15/005; G06T 15/04
See application file for complete search history.

(56) References Cited

U.S. PATENT DOCUMENTS 6,477,201 B1    11/2002 Wine et al.
2007/0109154 A1*  5/2007 Fallon .................... G06T 9/00
                                                    341/50

(Continued)

FOREIGN PATENT DOCUMENTS

JP    2002-517142 A    6/2002
KR    10-2010-0016803 A    2/2010

OTHER PUBLICATIONS

Kim, MinKyu, "Dynamic Rendering Quality Scaling Based on Resolution Changes", IEICE Transactions on Information and Systems, 2015, vol. E98.D, pp. 2353-2357 (Year: 2015).*

(Continued)

*Primary Examiner* — Terrell M Robinson
(74) *Attorney, Agent, or Firm* — Sughrue Mion, PLLC

(57) ABSTRACT

The embodiments herein provide a mobile device comprising a display, and a processor configured to receiving a texture to be rendered on the display, checking at least one rendering parameter for the received texture wherein the rendering parameter comprises at least one of a device
(Continued)

resolution, available memory, rendering path, and texture type, selecting at least one memory optimization technique based on the at least one rendering parameter, wherein the memory optimization technique is at least one of Dynamic Texture Scaling (DTS), Content Adaptive Compression (CAC), and On Device Texture Compression (ODTC) and performing the selected texture optimization technique on the received texture.

13 Claims, 8 Drawing Sheets

(30) Foreign Application Priority Data

Jun. 29, 2016 (IN) .............................. 201641022245
Jan. 12, 2017 (IN) .............................. 201641001496

(51) Int. Cl.
| | | |
|---|---|---|
| G06T 7/13 | (2017.01) | |
| G06T 1/20 | (2006.01) | |
| G06T 3/40 | (2006.01) | |
| G06T 5/00 | (2006.01) | |
| G06T 15/00 | (2011.01) | |
| G06T 15/04 | (2011.01) | |
| G06T 17/20 | (2006.01) | |

(52) U.S. Cl.
CPC ................ *G06T 5/002* (2013.01); *G06T 7/13* (2017.01); *G06T 15/005* (2013.01); *G06T 15/04* (2013.01); *G06T 17/20* (2013.01)

(56) References Cited

U.S. PATENT DOCUMENTS

| | | | |
|---|---|---|---|
| 2009/0051696 A1 | 2/2009 | Hux et al. | |
| 2013/0162633 A1* | 6/2013 | Berger | G06T 15/04 345/419 |
| 2014/0139527 A1 | 5/2014 | McKellar | |
| 2014/0240329 A1* | 8/2014 | Tarjan | G06T 15/04 345/520 |
| 2014/0247982 A1* | 9/2014 | Norberg | G06T 9/00 382/166 |
| 2014/0342822 A1* | 11/2014 | Nordenstam | A63F 13/00 463/30 |
| 2014/0362159 A1* | 12/2014 | Zhai | H04N 19/117 348/14.01 |
| 2015/0279055 A1* | 10/2015 | Kaburlasos | G06T 9/00 345/587 |
| 2015/0334403 A1 | 11/2015 | Smithers et al. | |
| 2016/0027145 A1* | 1/2016 | Taylor | G09G 5/393 345/555 |
| 2018/0091808 A1 | 3/2018 | Chung | |

OTHER PUBLICATIONS

Search Report dated Apr. 19, 2017, issued by the International Searching Authority in counterpart International Patent Application No. PCT/KR2017/000516.

* cited by examiner

[Fig. 1]
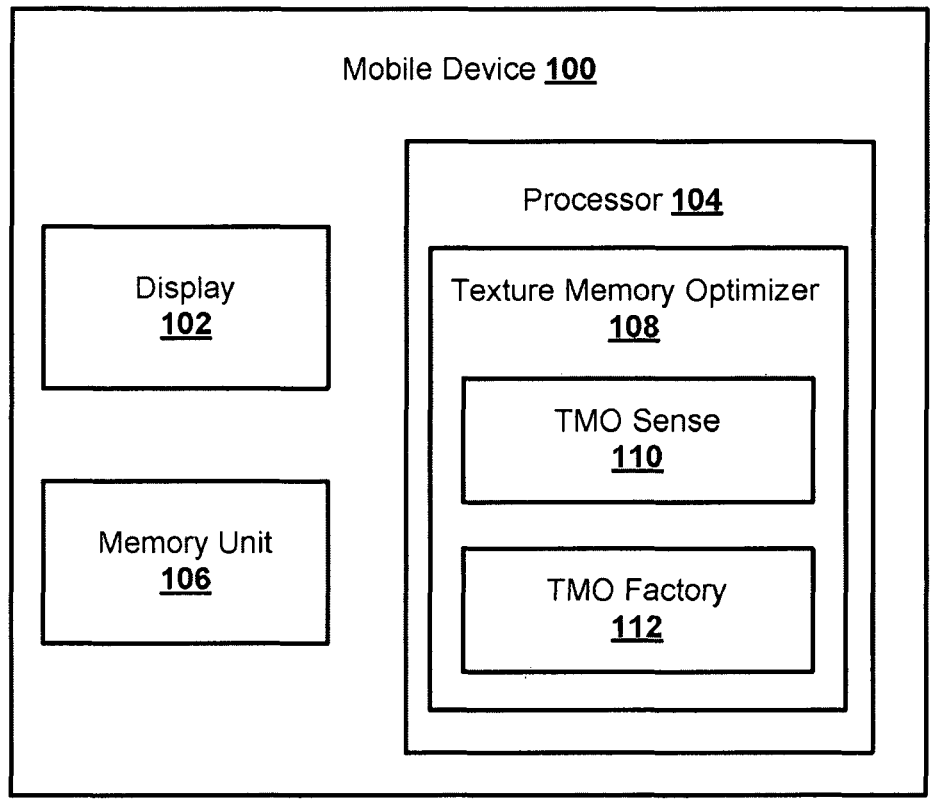
[Fig. 2]
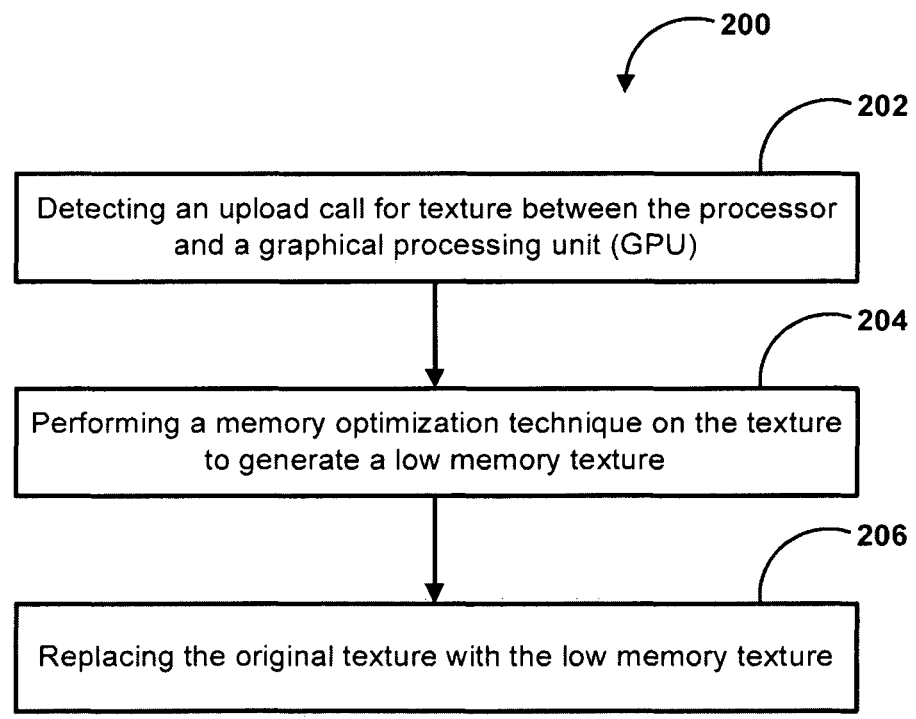

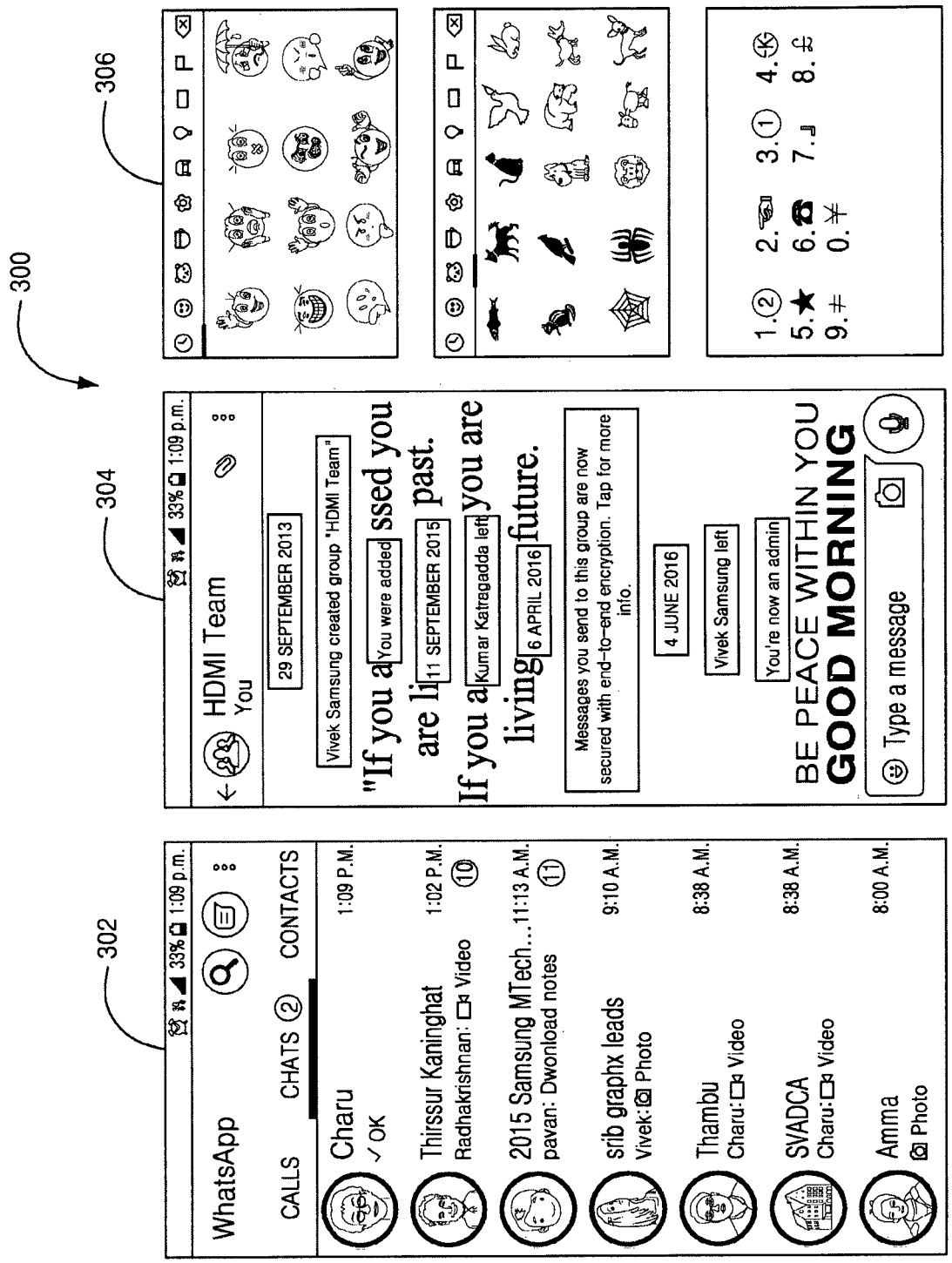
[Fig. 3]

[Fig. 4]
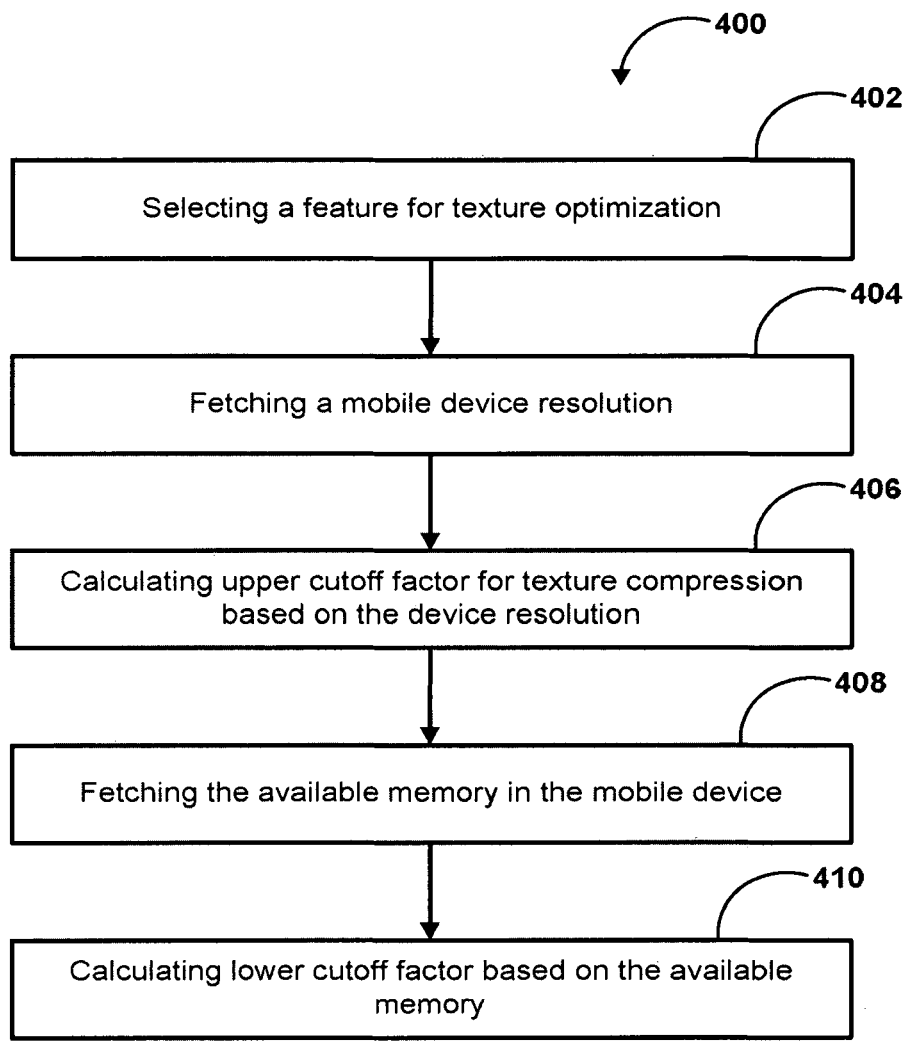

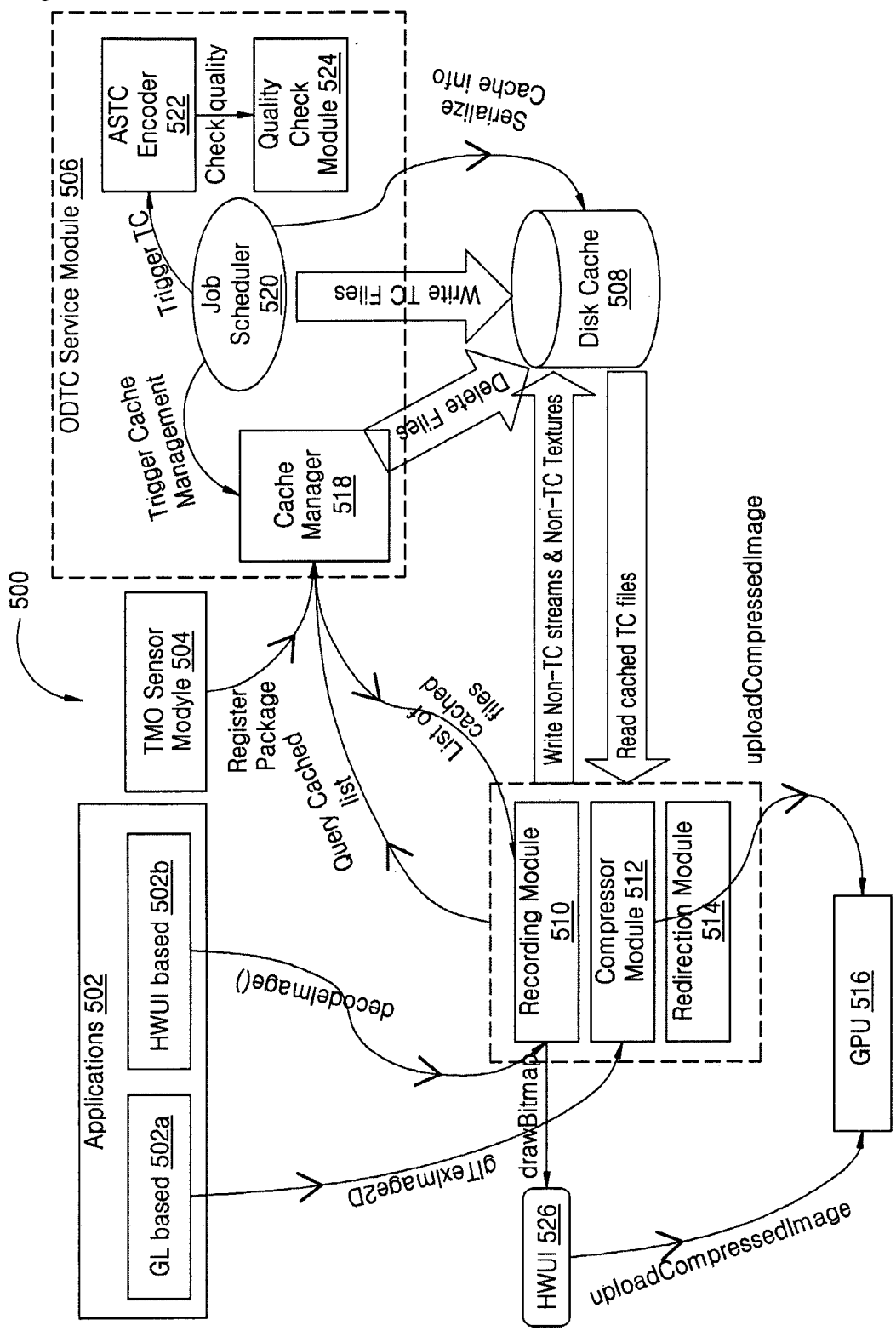
[Fig. 5]

[Fig. 6]
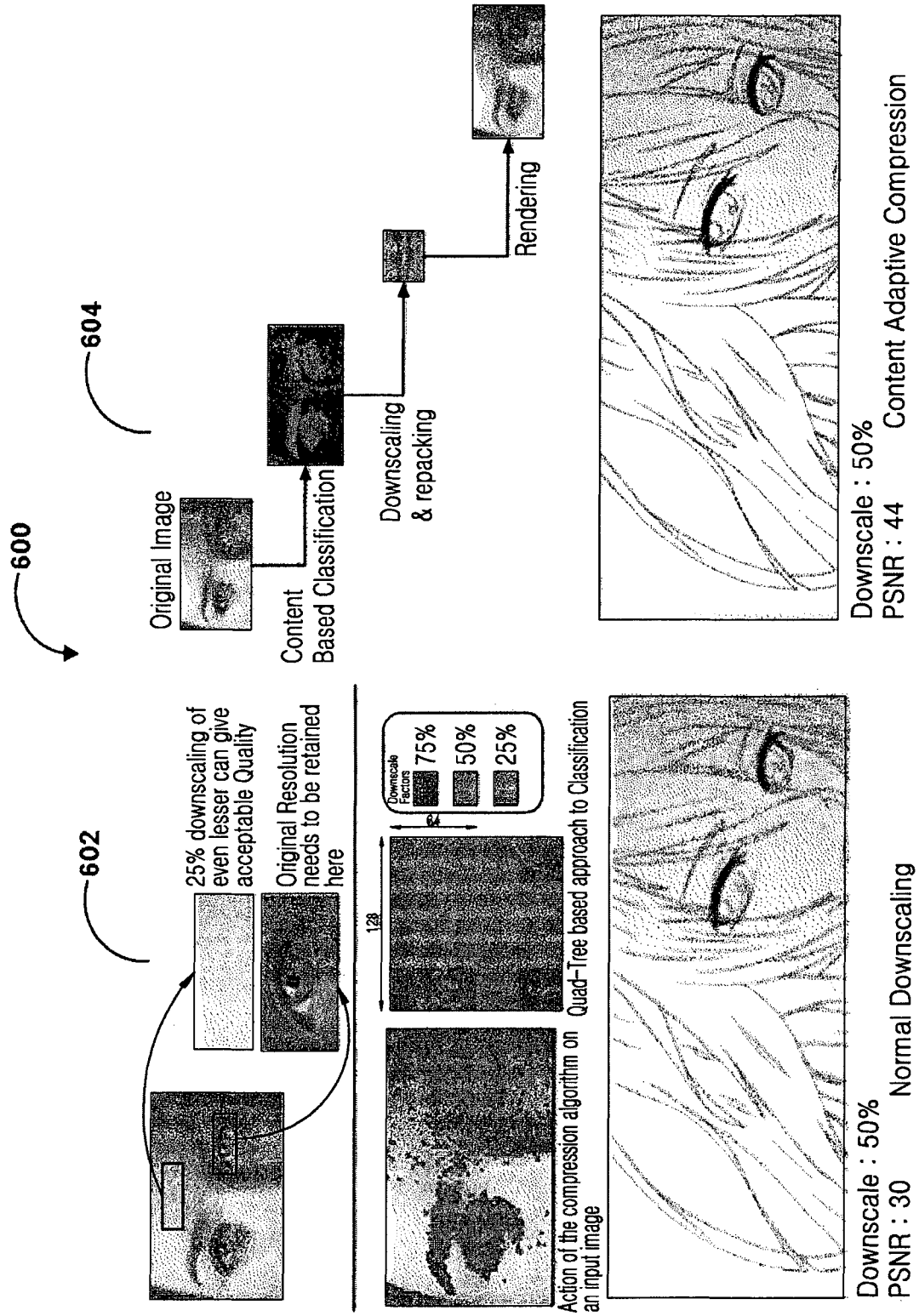

[Fig. 7]
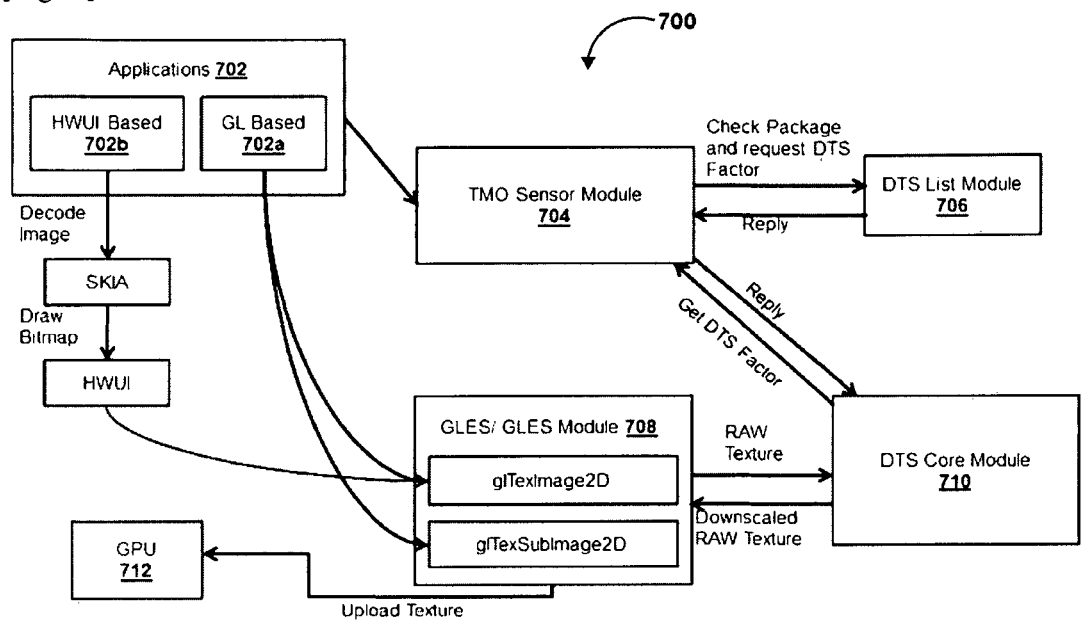

[Fig. 8]
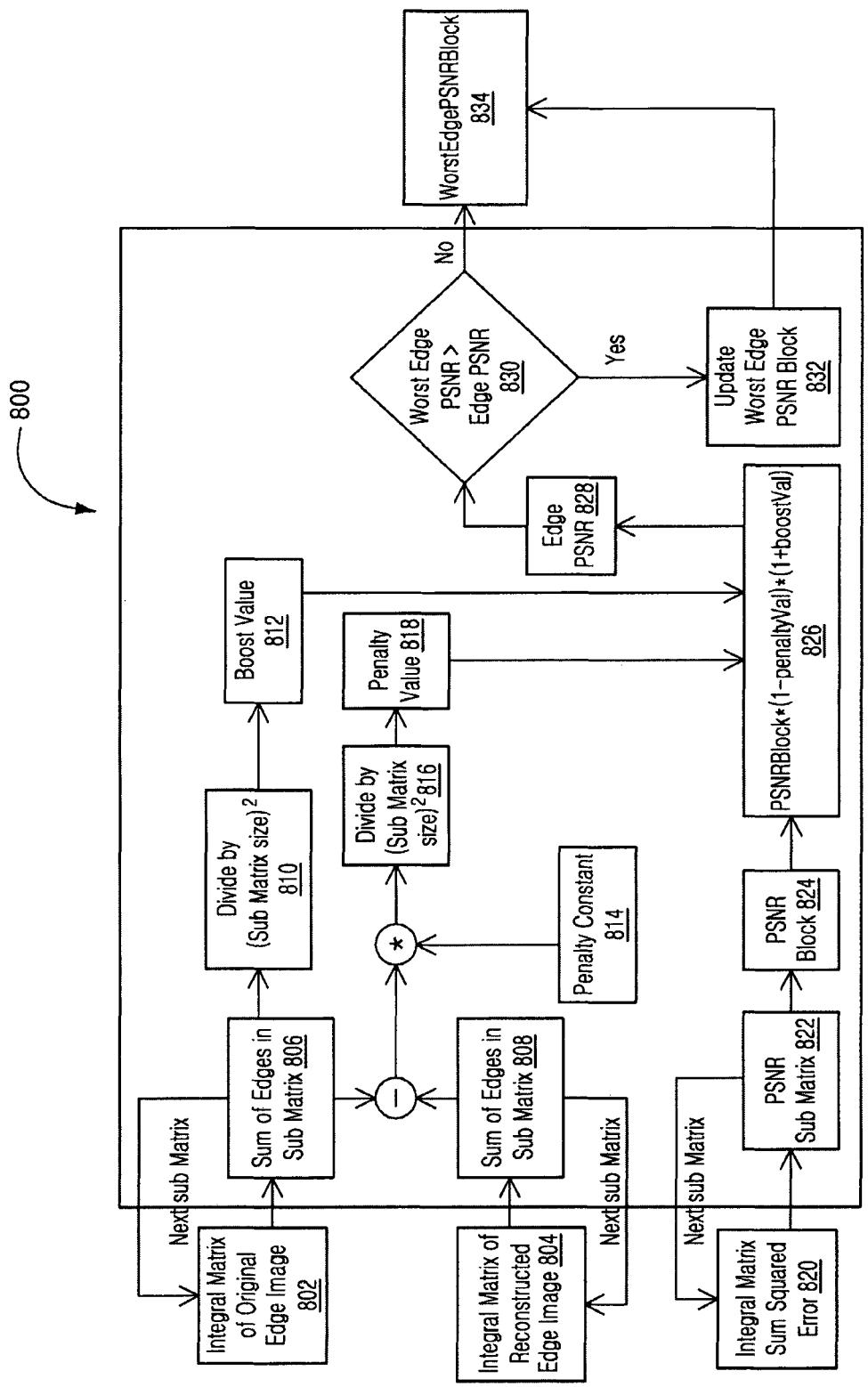

[Fig. 9]
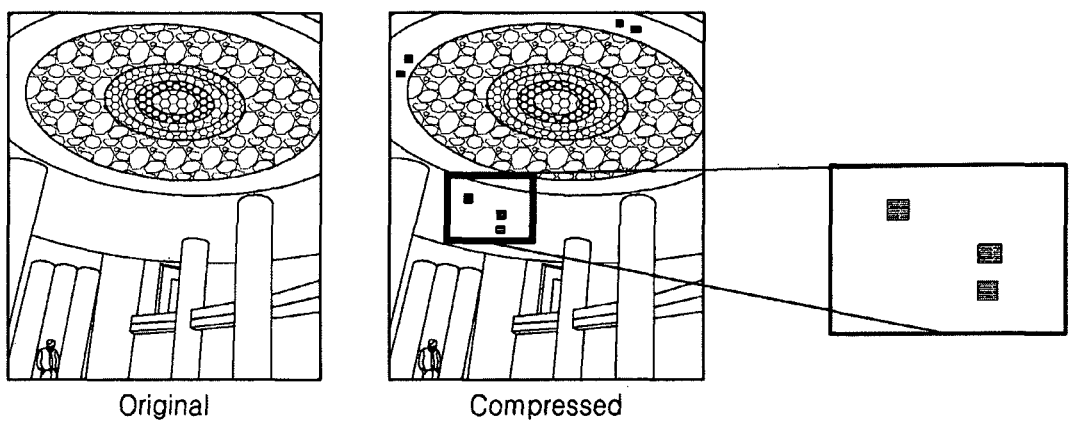
Original    Compressed

MOBILE DEVICE AND A METHOD FOR TEXTURE MEMORY OPTIMIZATION THEREOF

CROSS-REFERENCE TO RELATED APPLICATIONS

The present disclosure claims benefit of the Indian Provisional Application No. 201641001496 filed on 14 Jan. 2016, Indian Provisional Application No. 201641013011 filed on 13 Apr. 2016, Indian Provisional Application No. 201641022245 filed on 29 Jun. 2016, and Indian Application No. 201641001496 filed on 12 Jan. 2017, the disclosure of which is hereby incorporated by reference herein.

TECHNICAL FIELD

The present disclosure generally relates to memory optimization and particularly relates to a system and method for texture memory optimization.

BACKGROUND ART

Graphics processors or graphics processing units (GPU's) are commonly used to generate three dimensional (3D) graphic images for a variety of multimedia devices including, but not limited to, laptop, computer, mobile phone, tablet, PDA, television, and the like. These processors often include dedicated circuitry configured to process graphics data stored in memory to create 3D images in a frame buffer for presentation to a display. The 3D images created by the graphics processor generally comprise a geometric object or polygon with a texture applied to the surface. The graphics processor may also perform other functions such as translation and rotation of vertices into different coordinate systems and shading to produce the appropriate levels of light and colors within an image.

Today, there is an ever-increasing demand for more textures with higher resolution to improve the aesthetics of graphic imagery. This demand has grown in step with advancements in processor technology. However, memory technology has grown at a slower rate. As a result, graphic designers are constantly challenged to provide enough memory bandwidth to exploit the full processing capabilities of modern processors in various electronic devices such as, but not limited to, mobile phones, laptop, PDA, tablet, smart watch, other smart gears and the like.

Texture compression techniques are widely used by graphics processors to meet these challenges. Texture compression involves the storing of texture data in a compressed format in memory. The goal of texture compression being reducing memory consumption while retaining the quality of the original texture at an acceptable level. Today textures are compressed while the application is packaged before shipping.

Currently there are many compression formats available such as, ETC1/2, PVRTC, S3TC, ASTC, and the like, which can be applied on resources before packaging the application. But the current technologies are facing different problems such as, reduction in RAM usage without making any changes to an application, and application/game developers need not keep different versions of resources/Applications to suit different hardware.

Currently, if there are multiple applications running on a user equipment (UE) and consuming more than threshold amount of cache memory of random access memory (RAM), the UE may face lag in response time and thus affecting the performance. If user of the UE wishes to open any additional applications, then to accommodate execution of new application, the processor of the UE may use low memory killer (LMK) policy, wherein in the LMK policy, the processor may kill one or more applications instantly to make required cache memory for the new applications that are to be executed. The LMK policy for killing one or more running applications can be applied by considering various parameters and different methods. Upon killing one or more applications, the new applications can be executed on the processor. But, this affects user experience and performance of the UE.

In view of the foregoing, there is a need to provide a system and method for texture memory optimization.

The above-mentioned shortcomings, disadvantages and problems are addressed herein and which will be understood by reading and studying the following specification.

DISCLOSURE

Technical Solution

Accordingly the embodiments herein provide a mobile device comprising a display; and a processor configured for receiving a texture to be rendered on the display; checking at least one rendering parameter for the received texture, selecting at least one texture optimization technique based on the at least one rendering parameter, wherein the at least one texture optimization technique is at least one of a Dynamic Texture Scaling (DTS), Content Adaptive Compression (CAC), and On Device Texture Compression (ODTC); and performing the selected texture optimization technique on the received texture.

Advantageous Effects

Accordingly the embodiments herein provide a method for a memory optimization in a multicore processor system including a big-core processor, and a little-core processor.

DESCRIPTION OF DRAWINGS

This disclosure is illustrated in the accompanying drawings, throughout which like reference letters indicate corresponding parts in the various figures. The embodiments herein will be better understood from the following description with reference to the drawings, in which:

FIG. 1 is a schematic diagram illustrating structure of a texture memory optimizer (TMO), according to an embodiment as disclosed herein;

FIG. 2 is a schematic flow diagram illustrating a method for feature selection, according to an embodiment as disclosed herein;

FIG. 3 is a schematic diagram illustrating a use case for a texture analyzer, according to an embodiment as disclosed herein;

FIG. 4 is a schematic flow diagram illustrating a method for feature parameter selection, according to an embodiment as disclosed herein; and FIG. 5 is a schematic block diagram illustrating on-device texture compression (ODTC) in the texture memory optimizer (TMO), according to an embodiment as disclosed herein.

FIG. 6 is a schematic diagram illustrating content adaptive compression (CAC) in the texture memory optimizer (TMO), according to an embodiment of the present disclosure.

FIG. 7 is a schematic block diagram illustrating dynamic texture scaling (DTS) in the texture memory optimizer (TMO), according to an embodiment of the present disclosure.

FIG. 8 is a schematic block diagram illustrating edge based peak signal to noise ratio (EB-PSNR) in the texture memory optimizer (TMO), according to an embodiment of the present disclosure.

FIG. 9 is a schematic diagram illustrating comparison by the EB-PSNR between original image and the compressed image, according to an embodiment of the present disclosure.

BEST MODE

Accordingly the embodiments herein provide a mobile device comprising a display, and a processor configured to receiving a texture to be rendered on the display, checking at least one rendering parameter for the received texture wherein the rendering parameter comprises at least one of a device resolution, available memory, rendering path, and texture type, selecting at least one memory optimization technique based on the at least one rendering parameter, wherein the memory optimization technique is at least one of Dynamic Texture Scaling (DTS), Content Adaptive Compression (CAC), and On Device Texture Compression (ODTC) and performing the selected texture optimization technique on the received texture.

According to an embodiment of the present disclosure, a memory optimization method comprising steps of detecting texture upload call for a texture between CPU and GPU, performing a memory optimization technique on the texture to generate a low memory texture, wherein the memory optimization technique comprises at least one of one rendering parameter, wherein the memory optimization technique is at least one of On Device Texture Compression (ODTC), Content Adaptive Compression (CAC) and Dynamic Texture Scaling (DTS), and replacing the original texture with the low memory texture to be sent to the GPU.

According to an embodiment of the present disclosure, the ODTC based memory optimization technique comprises of inputting, to a recording module, one or more textures which are not provided earlier for compression, compressing, by a compressor module, the inputted one or more textures, and replacing, by a redirection module, the one or more inputted texture with a compressed texture if a corresponding compressed file of the texture is available.

According to an embodiment of the present disclosure, the compressor module comprises of a Cache manager unit adapted for tracking of one or more applications and one or more textures that are to be retained on a device memory, retaining textures of one or more applications which are frequently used, removing the one or more textures which are not used, a job scheduler unit adapted for ensuing that the texture compression happens only when the mobile device is in idle mode, an ASTC encoder comprising a library to compress into ASTC, and a quality Checker unit adapted to ensure that the images are of acceptable quality.

According to an embodiment of the present disclosure, the compressor module further comprises of an alarm receiver for triggering an ODTC session, where the alarm receiver can be configured for every predetermined period of time.

According to an embodiment of the present disclosure, the CAC based texture optimization technique comprises of inputting, to a classification module, one or more images; performing, by the classification module, classification of each sub image based on an information content, downscaling, by a downscaling module, each sub image based on the classification and creating a mesh and a texture atlas from the downscaled sub images.

According to an embodiment of the present disclosure, the DTS based texture optimization technique comprises of determining, by a TMO sense module, a DTS downscaling ratio for the texture based on one or more criteria, where the one or more criteria comprises of a device resolution, texture quality, and a mode of saving of the image, providing, by a DTS list module, a list of applications and an optimal downscaling ratio of the applications for one or more devices, performing a DTS core module elaboration, and performing an EDGE BASED PEAK SIGNAL TO NOISE RATIO (EB-PSNR) for ensuring the quality of the compressed images.

According to an embodiment of the present disclosure, the TMO sensor module is further adapted for identifying a rendering path of a content during a feature selection and performing a texture analysis on the identified rendering path. Here the rendering path of the content is at least one of a hardware user interface (HWUI) and an extended graphical language (EGL).

According to an embodiment of the present disclosure, the TMO sensor module is further adapted for determining a level of compression to be applied for the feature parameter selection. Here the feature parameter selection is performed based on parameters such as, but not limited to, a scale factor, a compression factor, a device resolution and available device memory.

According to an embodiment of the present disclosure, the method of performing EB-PSNR for ensuring the quality of the compressed image comprises of obtaining, by a canny edge detector, edge images of original texture and reconstructed texture of the compressed image, determining, PSNR of blocks by calculating a Sum Squared Error (SSE) after applying smoothening on the image and reconstructed texture of the compressed image, performing different levels of smoothening and SSE for each level is accumulated as a final average sum squared error, finding an edgePSNR block based on the edge images, penalty and boost factors calculated for blocks of image along with a PSNR corresponding to these blocks, identifying a worst edgePSNR block after finding the edge PSNR block for the plurality of blocks in the image, and checking if the un-ideal edgePSNR is above a preset threshold PSNR or not.

According to an embodiment of the present disclosure, to find edgePSNR, each image is treated as a sub image or block and then calculate PSNR for each block instead of the entire image. Here the lowest PSNR block is reported as the image's quality value. This thereby prevents the averaging out issue of PSNR. Further, in blocks which has very little edges, and if new edges are formed due to compression artifact, these artifacts are clearly visible to human eyes. This makes the image un-usable. Such blocks are penalized and reduces the quality value even further. In blocks, which already has lots of edge content, adding or removing blocks will not be readily perceivable by the human eyes. Such blocks are boosted, and increase the quality value.

According to an embodiment of the present disclosure, obtaining edge images of original texture and reconstructed texture of the compressed image by a canny edge detector comprises steps of converting an RGB image into a LUV color space, splitting the LUV color space in a single channel L, U and V image, and applying canny edge detector to the L, U and V images to obtain corresponding edge images.

The foregoing has outlined, in general, the various aspects of the invention and is to serve as an aid to better understand the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

MODE FOR INVENTION

The present disclosure provides a system and method for texture memory optimization. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

According to an embodiment of the present disclosure, a method for texture memory optimization is described herein. The present memory optimization process is happening in a mobile device for optimizing texture memory. The person having ordinarily skilled in the art can understand that the present disclosure can be used in any of user equipment (UE) which uses texture memory, such as, but not limited to, laptops, PDA, laptop, tablets, smart watch, and the like, without departing from the scope of the invention.

According to the present disclosure, the method comprises of detecting, by a processor, texture upload call for a texture between a processor and a graphical processing unit (GPU). User of the mobile device attempts to access graphical content on display of the mobile device and thus opens up any of the application which is having graphical content. Upon tapping on icon of the application, the processor detects that the user wishes to attempt the application via the texture upload call and thus texture content associated with the application needs to be uploaded on the GPU.

Further, the method comprises of performing, by the processor, a memory optimization technique on the texture to generate a low memory texture. As the texture memory needs to be uploaded on cache memory of the GPU for displaying on the display of the mobile device is more, the processor performs the memory optimization on the texture to generate low memory texture, and thus the memory required by the GPU for displaying the content will be less. In an embodiment of the present disclosure, the memory optimization technique to generate low memory texture can be at least one of, but not limited to, On Device Texture Compression (ODTC), Content Adaptive Compression (CAC), Dynamic Texture Scaling (DTS), and the like.

Further, the method comprises of replacing the original texture with the low memory texture to be sent to the GPU. Upon performing the memory optimization using any of the above-mentioned memory optimization techniques, the processor obtains the texture with low memory. The processor replaces the original texture with the texture with low memory and transmits to the GPU for displaying on the display of the mobile device.

In an embodiment of the present disclosure, the ODTC based memory optimization technique comprises of inputting, to a recording module, one or more textures which are not provided earlier for compression. The recording module receives the one or more textures from the processor which were not provided earlier for compression but based on the user's requirement and considering that the texture memory that is to be displayed on the display of the mobile device needs to be compressed.

Further, the method comprises of a compressor module compresses the inputted one or more textures. Upon receiving the one or more texture by the receiving module, the compressor module receives the one or more textures for the compression. According to an embodiment of the present disclosure, the compressor module comprises of a cache manager unit that tracks one or more applications and one or more textures that are to be retained on a device memory. Further, the cache manager unit retains textures of one or more applications which are frequently used. The cache manager unit further removes the one or more textures which are not used.

Further, the compressor module comprises of a job scheduler unit that ensures that the texture compression happens only when the mobile device is in idle mode. Further, the compressor module comprises of an ASTC encoder that comprises a library to compress into ASTC. Further, the compressor module comprises of a quality Checker unit that ensures that the images are of acceptable quality.

Further, the ODTC memory optimization technique comprises of replacing, by a redirection module, the one or more inputted texture with a compressed texture if a corresponding compressed file of the texture is available. Upon compressing the texture by the compressor module, the redirection module checks for which inputted textures corresponding compressed textures are available. The redirection module replaces the compressed textures for the inputted textures and thus consuming less cache memory while displaying.

In another embodiment of the present disclosure, the compressor module further comprises of an alarm receiver for triggering an ODTC session, wherein the alarm receiver can be configured for every predetermined period of time. In an embodiment of the present disclosure, the alarm receiver can be configured for every thirty minutes. The person having ordinarily skilled in the art can understand that the alarm receiver can be configured based on the requirement the session, without departing from the scope of the invention.

According to another embodiment of the present disclosure, the CAC based texture optimization technique comprises steps of inputting, to a classification module, one or more images. Upon identifying that the texture of the image content is to be compressed using CAC based texture compression technique, the processor inputs the one or more images to the classification module.

Further, the method comprises of the classification module performing content based classification of the one or more images. Upon receiving the one or more images, the classification module performs classification of the one or more images based on the content.

Further, the method comprises of downscaling and repacking the image. The classified content is selected and downscaled and repacked and further the method comprises of rendering the image to the display of the mobile device.

According to the present disclosure, the redundancy in the image is exploited to reduce random access memory (RAM) consumed and at the same time, preserve the quality of the image. Block level classification is the fundamental principle behind the CAC based texture optimization technique. In another embodiment of the present disclosure, the one or more images can be displayed using a mesh, which is a collection of triangles, instead of the conventional quad based drawing.

According to the present technique, an image is converted into an edge image, and the count of the number of pixels in an image is treated as entropy or the measure of the information in the image. Based on this measure, four separate thresholds are chosen. A block starting at 64×64 size is taken and its energy measure is calculated based on which an image is downscaled into 75,50,25 percentage of its original size. If the block in consideration has single colored pixels, the block is represented as a single pixel. Blocks with high information content are prevented from downscaling and its original size is retained.

Each of these downscaled blocks results into a set of two triangles, and the downscaled images form a small texture unit. Later the set of triangles are formed into a mesh, and the individual texture units are packed into a texture atlas.

The size of the texture atlas is usually a fraction of the size of the original image based on the type of content. The mesh information, which acts as a header is also very small overhead when compared to the texture atlas size. The texture atlas and mesh information are directly uploaded into the GPU and rendered onto the display frame buffer, thereby saving the RAM memory.

According to another embodiment of the present disclosure, the DTS based texture optimization technique comprises steps of determining, by a TMO sense module, a DTS downscaling ratio for the texture based on one or more criteria, where the one or more criteria comprises of a device resolution, texture quality, and a mode of saving of the image. Upon identifying that the texture of the one or more images has to be optimized by the DTS based technique, the processor transmits the one or more images to the TMO sense module, wherein the TMO sense module receives the one or more images and determines the DTS downscaling ratio for the texture based on the one or more criteria. In an embodiment of the present disclosure, the one or more criteria for downscaling the texture includes, but not limited to, device resolution, texture quality, mode of saving of the image, and the like, and the person having ordinarily skilled in the art can understand that any of the above-mentioned criteria can be used for texture downscaling in the DTS technique, without departing from the scope of the invention.

Further, the method comprises of providing, by a DTS list module, a list of applications and an optimal downscaling ratio of the applications for one or more devices. Upon identifying the criteria for downscaling the one or more images, the TMO sense module transmits the images to the DTS list module, wherein the DTS list module provides the list of application and the optimal downscaling ratio of the applications for one or more devices.

Based on the received list of applications, a DTS core module elaboration is performed. Further, the method comprises of performing an EDGE BASED PEAK SIGNAL TO NOISE RATIO (EB-PSNR) for ensuring the quality of the compressed images.

According to the present disclosure, the DTS based texture optimization technique is activated by the TMO sense module after analyzing at least one of the texture size and the device resolution, the amount of free system memory available and the nature of the GPU. The mobile device then performs the calculation of the optimal downscaling ratio for each of the texture. When the application tries to upload the texture content into the GPU, the texture upload call is intercepted and is downscaled by an optimal downscale factor. This downscaled content is then uploaded to the GPU. Due to the optimal downscale factor prediction, the user does not perceive any quality loss on the rendered application.

In an embodiment of the present disclosure, the method of performing EB-PSNR for ensuring the quality of the compressed image comprises steps of obtaining, by a canny edge detector, edge images of original texture and reconstructed texture of the compressed image. The canny edge detector receives both the original texture and the reconstructed texture of the compressed image. In an embodiment of the present disclosure, wherein obtaining, edge images of original texture and reconstructed texture of the compressed image by a canny edge detector comprises steps of converting an RGB image into a LUV color space, splitting the LUV color space in a single channel L, U and V image, and applying canny edge detector to the L, U and V images to obtain corresponding edge images.

Further, the method comprises of determining PSNR of blocks by calculating a Sum Squared Error (SSE) after applying smoothening on the image and reconstructed texture of the compressed image. Further, the method comprises of performing different levels of smoothening and SSE for each level is accumulated as a final average sum squared error. Further, the method comprises of finding an edgePSNR block based on the edge images, penalty and boost factors calculated for blocks of image along with a PSNR corresponding to these blocks. Further, the method comprises of identifying a worst/unideal edgePSNR block after finding the edge PSNR block for the plurality of blocks in the image. Further, the method comprises of checking if the worst/unideal edgePSNR is above a preset threshold PSNR or not.

FIG. 1 is a schematic diagram illustrating structure of a mobile device 100 comprising a texture memory optimizer (TMO), according to an embodiment of the present disclosure. According to the schematic diagram, the mobile device 100 comprises of a display 102, a processor 104, and a memory unit 106. The processor 104 further comprises of the texture memory optimizer (TMO) 108, wherein the TMO 108 comprises of a TMO sense 110 and a TMO factory 112. The TMO factory further comprises of an On-Device Texture Compression (ODTC) module, a Content Adaptive Compression (CAC) module, a Dynamic Texture Scaling (DTS) module, and an edge based peak signal to noise ratio (EBPSNR) module.

The display 102 of the mobile device 100 displays content of the mobile device 100 to the user. In an embodiment of the present disclosure, the display 102 can only display the content to the device. In another embodiment of the present disclosure, the display 100 can be a touch display that can receive input from the user along with displaying content to the user, without departing from the scope of the invention.

The processor 104 of the mobile device 100 receives a texture to be rendered on the display, checks at least one rendering parameter for the received texture wherein the rendering parameter comprises at least one of a device resolution, available memory, rendering path, and texture type, and selects at least one texture optimization technique based on the at least one rendering parameter, wherein the texture optimization technique is at least one of Dynamic Texture Scaling (DTS), Content Adaptive Compression (CAC), and On Device Texture Compression (ODTC). Further, the processor 104 performs the selected texture optimization technique on the received texture.

According to the present disclosure, the TMO 108 of the processor 104 further comprises of the TMO sense 110 and the TMO factory 112, wherein the TMO sense 110 performs two functions, feature selection and feature parameter selection. The TMO sense 110 identifies the application that user is attempting to open, and the size of the application and the content that the user is attempting to access.

During feature selection, the TMO sense 110 identifies the rendering path of the content and performs texture analysis based on the same. In an embodiment of the present disclosure, the rendering path of the content can be either hardware user interface (HWUI) or extended graphical language (EGL), without departing from the scope of the invention. Further, texture analysis provides information such as, but not limited to, usage count, texture type, and the like, without departing from the scope of the invention. Based on the identified information, the TMO 108 decides which solution is to be applied for optimization of the texture.

During feature parameter selection, the TMO 108 decides the level of compression/Savings to apply for the texture based on parameters such as, but not limited to, Scale Factor, Compression factor, and the like. Further, the feature parameter selection is performed based on, but not limited to, device resolution, available memory, and the like.

Further, the TMO 108 comprises of the TMO factory 112, wherein the TMO factory 112 comprises of the On-Device Texture Compression (ODTC) module that performs texture compression based on ODTC technique, the Content Adaptive Compression (CAC) module that performs texture compression based on CAC technique, the Dynamic Texture Scaling (DTS) module that performs texture compression based on DTS technique, and an edge based peak signal to noise ratio (EB-PSNR) module.

The memory unit 106 of the mobile device 100 stores the content associated with the user and the one or more applications accessed by the user, without departing from the scope of the invention.

FIG. 2 is a schematic flow diagram 200 illustrating a method for feature selection, according to an embodiment of the present disclosure. According to the flow diagram 200, at step 202, the processor detects texture upload call for a texture between CPU and GPU. Further, at step 204, the processor performs a memory optimization technique on the texture to generate a low memory texture, wherein the memory optimization technique is at least one of On Device Texture Compression (ODTC), Content Adaptive Compression (CAC) and Dynamic Texture Scaling (DTS). Further, at step 206, the processor replaces the original texture with the low memory texture to be sent to the GPU.

FIG. 3 is a schematic diagram 300 illustrating a use case for a texture analyzer, according to an embodiment of the present disclosure. According to the schematic diagram 300, the texture analyzer identifies the content, analyzes the available information and allows the mobile device to optimize the texture of the content. The present use case is explained with respect to ODTC texture optimization technique. Similarly, any other texture optimization technique can be used depending on the selected feature, and parameters of the features, without departing from the scope of the invention.

According to the diagram 300, user opens WhatsApp application, as shown in 302. As soon as the user accesses WhatsApp application, processor of the mobile device identifies that the content associated with the user for the WhatsApp application needs to be displayed on the display. Upon opening the application, the processor of the mobile device analyzes the content that is displayed on the application. Based on the profile, the processor identifies that one or more icons and profile pictures of contacts/groups are frequently used, which do not change much. Thus, the processor identifies them as constant information.

Further, the wallpaper/background of the application consumes more space and thus at step 304, the processor identifies that the wallpaper is constant for most of the time and thus is frequently used. Further, the processor identifies that smileys consume lot of memory and thus at 306, the processor identifies the frequently used smileys.

The content identified by the processor can be stored as recorded and will be compressed only once. The compressed information can be used continuously if there is no change in it. While accessing the WhatsApp application, when the processor identifies the other additional information, and identifies any different data, then the processor applies ODTC texture optimization technique on the remaining content. Upon optimizing the texture, the processor can add the other recorded information to the optimized information and display the content to the user, which consumes less memory than the actual information.

FIG. 4 is a schematic flow diagram 400 illustrating a method for feature parameter selection, according to an embodiment of the present disclosure. According to the FIG.

4, the flow diagram 400 illustrates deciding compression factor for different solutions available for compressing texture of the content to be displayed on display of the mobile device. The flow diagram 400 illustrates calculating both upper cut off and lower cut off for different solutions.

According to the flow diagram 400, at step 402, processor of the mobile device selects a feature for optimizing the texture. In an embodiment of the present disclosure, feature selection includes identifying one of the solutions, such as, but not limited to, ODTC, CAC, and DTS that is to be applied to the texture for compression. At step 404, the processor fetches the mobile device resolution. At step 406, the processor calculates the upper cutoff factor, which describes the maximum resolution that the mobile device can display.

Further, at step 408, the processor fetches available free memory of optimization of the texture. At step 410, the processor calculates lower cutoff factor for the available memory.

For every solution, the compression factor can be calculated. Based on the calculations, it can be observed that the higher compression factors lead to more memory Savings, but at the cost of quality of the image. Based on the mobile device resolution, upper cutoff for compression factor is computed, which will not affect the Perceptual quality of the image being rendered. Similarly, based on available memory, lower cutoff is decided. If the optimization goes below the lower cutoff, then the quality of the image reduces beyond permissible limits.

FIG. 5 is a schematic block diagram 500 illustrating on-device texture compression (ODTC) in the texture memory optimizer (TMO) of a mobile device, according to an embodiment of the present disclosure. According to the block diagram 500, the mobile device comprises of one or more applications 502, a TMO sensor module 504, an ODTC service module 506, a disk cache 508, a recording module 510, a compressor module 512, a redirection module 514, and a graphical processing unit (GPU) 516. Further, the ODTC service module 506 comprises of a cache manager 518, a job scheduler 520, an ASTC encoder 522, and a quality check module 524. Further, the mobile device comprises of a Hardware User Interface (HWUI) 526.

According to the block diagram 500, the one or more applications 502 present on the mobile device can be graphical language (GL) based applications 502a or hardware user interface (HWUI) based applications 502b. In an embodiment of the present disclosure, GL based applications 502a are the applications that require GPU to process and display the data, such as, but not limited to, openGL games, Skype and the like, without departing from the scope of the invention. According to another embodiment of the present disclosure, HWUI based applications 502b can be any of the applications that need minimum support of GPU for processing and displaying the data such as, but not limited to, Facebook, Whatsapp, Kako Talk, and the like, without departing from the scope of the invention. The person having ordinarily skilled in the art can understand that any of the known GL based 502a or HWUI based applications 502b can be accessed on the mobile device, without departing from the scope of the invention.

As soon as the user accesses the application, the TMO sense 504 identifies that the user has accessed one of the application, and thus transmits the register package associated with the accessed application to the cache manager 518, wherein register package comprises of texture of the application. The cache memory 518 records files associated with the accessed application on the disk cache 508 for easy access. The job scheduler 520 adds the information associated with the application in a scheduler queue for execution and information the cache manager 518 for easy management of the information. The ASTC encoder 522 encodes the record files of the accessed application, and transmits to quality check module 524 that checks the quality of the encoded information.

Simultaneously, the accessed application information is transmitted to the recording module 510 that receives one or more textures which are not provided earlier for compression and records the information on disk cache 508. Further, the compressor module 512 compresses the received texture of the application and the compressed texture are saved on the disk cache 508. The redirection module 514 reads the compressed texture content from the disk cache 508 and transmits to the GPU 516. If the compressed texture content/information is associated with the GL based application 502a, then the content is directly transmitted to the GPU 516. If the compressed texture content/information are associated with the HWUI based application 502b, then the content is transmitted to the HWUI 526 and then to the GPU 516.

FIG. 6 is a schematic diagram 600 illustrating content adaptive compression (CAC) in the texture memory optimizer (TMO), according to an embodiment of the present disclosure. According to the diagram 600, at 602, normal downscaling process is described, wherein a processor identifies an image that needs to be compressed and displayed on a display. The processor receives the image, identifies the content in the image. From the obtained image, the processor identifies that part of the content is repetitive and rest of the content is non-repetitive. The content which is repetitive can be downscaled by 25% to give acceptable quality, and the non-repetitive content needs to be retained as it is without compression. Based on the performed analysis, the image can be downscaled and displayed to the user.

At 604, according to CAC based texture compression technique, the processor receives the original image, and based on the received original image, content based classification is performed. Upon performed content based classification, downscaling and repacking of the content is performed, and the content is rendered to the user for display.

According to the present disclosure, the redundancy in the image is exploited to reduce random access memory (RAM) consumed and at the same time, preserve the quality of the image. Block level classification is the fundamental principle behind the CAC based texture optimization technique. In another embodiment of the present disclosure, the one or more images can be displayed using a mesh, which is a collection of triangles, instead of the conventional quad based drawing.

For an instance, an image is converted into an edge image, and the count of the number of edge pixels in an image is treated as entropy or the measure of the information in the image. Based on this measure, four separate thresholds are chosen. A block starting at 64×64 size is taken and its energy measure is calculated based on which an image is downscaled into 75,50,25 percentage of its original size. If the block in consideration has single colored pixels, the block is represented as a single pixel. Blocks with high information content are prevented from downscaling and its original size is retained.

Each of these downscaled blocks results into two triangles, and the downscaled images form a small texture unit. Later the two triangles are formed into a mesh, and the individual texture units are packed into a texture atlas.

The size of the texture atlas is usually a fraction of the size of the original image based on the type of content. The mesh information, which acts as a header is also very small overhead when compared to the texture atlas size. The texture atlas and mesh information are directly uploaded into the GPU and rendered onto the display frame buffer, thereby saving the RAM memory.

FIG. 7 is a schematic block diagram 700 illustrating dynamic texture scaling (DTS) in the texture memory optimizer (TMO) of a mobile device, according to an embodiment of the present disclosure. According to the block diagram 700, the mobile device comprises of one or more applications 702, a TMO sense module 704, a DTS list module 706, an openGL for embedded system (GLES)/GLES2 module 708, a DTS core module 710, and a graphical processing unit (GPU) 712.

According to the block diagram 700, the one or more applications 702 present on the mobile device can be graphical language (GL) based applications 702a or hardware user interface (HWUI) based applications 702b. The types of GL based applications 702a and HWUI based applications 702b are described herein above and thus not disclosed herein again to avoid repetition.

Further, the TMO sense module 704 identifies the application accessed by the user, and determines a DTS downscaling ratio for the texture based on one or more criteria, wherein the one or more criteria comprises of a device resolution, texture quality, and a mode of saving of the image. The TMO sense module 704 provides the downscaling ratio information to the DTS list module 706, wherein the DTS list module 706 provides the TMO sense module 704 with a list of applications and an optimal downscaling ratio of the applications for one or more devices.

Further, the application accessed by the user is provided to the GLES/GLES2 module 708. If the accessed application is GL based application 702a, then the application is directly provided to the GLES/GLES2 module 708. If the accessed application is HWUI based application 702b, then images associated with the accessed application are decoded, a bitmap image is drawn and the bitmap image is provided to the GLES/GLES2 module 708, wherein texture of the image is raw in nature.

The GLES/GLES2 module 708 transmits the raw texture information to the DTS core module 710, wherein the DTS core module 710 performs DTS core module elaboration for compression of the texture of the image and edge based peak signal to noise ratio (EB-PSNR) on the compressed images for ensuring quality of it. Further, the compressed texture of the image is provided to the GLES/GLES2 module 708, which in turn in provided to the GPU 712 for display.

FIG. 8 is a schematic diagram 800 illustrating edge based peak signal to noise ratio (EB-PSNR) in the texture memory optimizer (TMO), according to an embodiment of the present disclosure. According to the diagram 800, the present disclosure discloses a block based approach, namely canny edge detector in LUV color space, to measure quality of the image. According to the present disclosure, the canny edge detector is used to get the integral matrix of original edge image 802 and integral matrix of reconstructed edge image 804. The RGB image is converted into LUV color space which is then split to single channel L, U and V image. Thereafter, canny edge detector is applied to L, U and V images to get the corresponding edge images for each. These edge images are then combined back to obtained single edge image.

According to an embodiment of the present disclosure, the present method discloses a sum square error (SSE) that is used to determine PSNR of blocks. Sum Squared Error (SSE) is calculated after applying smoothening on the image and reconstructed image of compressed texture. Different levels of smoothening are done and SSE for each level is accumulated in final Average Sum Squared Error at 820. Based on these edge images, a penalty value 818 and a boost value 812 are calculated for blocks of image, which along with PSNR for these blocks finds the edgePSNRBlock 828. The above process is repeated for all the blocks in image and finally the block with the worst/inappropriate edgePSNRBlock is reported. Further it is checked, if the worst/unideal edgePSNRBlock is above a threshold EdgePSNR at 830. If the image passes the EBPSNR test, update the worst edge PSNR block 832 and display the worstedge PSNR block at 834. If the worst/unideal edgePSNRBlock is below the threshold EdgePSNR, the test fails and display the worstedge PSNR block at 834. This improves the ability to find quality issues which otherwise gets ignored in case of standard PSNR approach.

According to an embodiment of the present disclosure, the present method discloses a standard PSNR approach which calculates mean squared error on entire image, thus averaging the smaller but visible quality issues in the image and not reporting such issues. PSNR reports false positives i.e. the image is of high entropy, due to which PSNR reported is less, even though there is no visual defect in image. EB-PSNR takes care of false positives using Boost Value which is the average sum of edges in original image's edge image. PSNR reports false negatives i.e. the image has a small issue region but due to mean sum error on overall image it does not reduces PSNR and a high PSNR is reported. EBPSNR takes care of false negatives by using the block based approach.

FIG. 9 is a schematic diagram 900 illustrating comparison by the EB-PSNR between original image and the compressed image, according to an embodiment of the present disclosure. The EB-PSNR obtains two images, original image 902 and compressed image 904. Based on the obtained images, performs comparison to identify the noise level in the image, and thus to check the quality of the compressed image.

Based on the comparison between original image 902 and the compressed image 904, it can be observed that there are some significant issues that are identified, such as:

i) Block artifacts have been observed in compressed ASTC image, but not visible in original image.

ii) The above issues get ignored by PSNR quality check but are reported correctly by EBPSNR using its penalty and boost factors.

According to the preset invention, the collage of original images shows collection of some images, which were used for testing and the collage of compressed images shows the reconstructed images along with issues introduced by ASTC compression, which PSNR reports fail to show but EBPSNR is able to find such issues and report correctly.

The embodiments of the present disclosure provide better quality metric compared to PSNR, smaller but visible issues in images that can be easily identified, a mechanism for reduction in error during measurement of quality of images with JPG noise and provides reduction in false positive and false negative cases reported by PSNR.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice The invention, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The invention claimed is:

1. A mobile device comprising:
   a display; and
   a processor configured for:
      receiving a texture to be rendered on the display;
      checking at least one rendering parameter for the received texture,
      selecting at least one texture optimization technique based on the at least one rendering parameter, wherein the at least one texture optimization technique is at least one of a Dynamic Texture Scaling (DTS), Content Adaptive Compression (CAC), and On Device Texture Compression (ODTC); and
      performing the selected texture optimization technique on the received texture when the mobile device is in an idle mode.

2. The mobile device of claim 1, wherein the rendering parameter comprises at least one of a device resolution, available memory, rendering path and texture type.

3. A memory optimization method comprising:
   detecting, by a processor, a texture upload call for a texture between a processor and a Graphical Processing Unit (GPU);
   performing a texture optimization technique on the texture to generate a low memory texture when a mobile device is in an idle mode, wherein the texture optimization technique is at least one of On Device Texture Compression (ODTC), Content Adaptive Compression (CAC) and Dynamic Texture Scaling (DTS); and
   replacing the original texture with the low memory texture to be sent to the GPU.

4. The method of claim 3, wherein ODTC based texture optimization technique comprises:
   inputting one or more textures which are not provided earlier for compression;
   compressing the inputted one or more textures; and
   replacing the one or more inputted textures with a compressed texture if a corresponding compressed file of the texture is available.

5. The method of claim 4,
   further comprising:
      tracking of one or more applications and one or more textures that are to be retained on a device memory;
      retaining textures of the one or more applications which are frequently used;
      removing the one or more textures which are not used;
      verifying that the texture compression happens only when the mobile device is in the idle mode,
      compressing the textures into Adaptive Scalable Texture Compression according to an encoder library; and
      checking if the compressed textures are of acceptable quality.

6. The method of claim 4, further comprising triggering an ODTC session based on a predetermined time interval.

7. The method of claim 3, wherein the performing the CAC texture optimization technique comprises:
   inputting one or more images;
   classifying each sub image based on an information content;
   downscaling each sub image based on the classification; and
   creating a mesh and a texture atlas from the downscaled sub images.

8. A memory optimization method, the method being performed by a processor, comprising:
   detecting a texture upload call for a texture between a processor and a Graphical Processing Unit (GPU);
   performing a texture optimization technique on the texture to generate a low memory texture, wherein the texture optimization technique is at least one of On Device Texture Compression (ODTC), Content Adaptive Compression (CAC) and Dynamic Texture Scaling (DTS); and
   replacing the original texture with the low memory texture to be sent to the GPU,
   wherein the performing the DTS texture optimization technique comprises:
      determining a DTS downscaling ratio for the texture based on one or more criteria, where the one or more criteria comprises of a device resolution, texture quality, and a mode of saving of an image;
      providing a list of applications and an optimal downscaling ratio of the applications for one or more devices;
      performing a DTS core module elaboration; and
      performing an EDGE BASED PEAK SIGNAL TO NOISE RATIO (EB-PSNR) for ensuring the quality of one or more compressed images.

9. The method of claim 8, further comprising:
   identifying a rendering path of a content during a feature selection; and
   performing a texture analysis on the identified rendering path;
   wherein the rendering path of the content is at least one of a hardware user interface (HWUI) and an Extended Graphical Language (EGL).

10. The method of claim 8, further comprising: determining a level of compression to be applied for the feature parameter selection;
    wherein the feature parameter selection is performed based on one or more parameters comprising a scale factor, a compression factor, a device resolution, and available device memory.

11. The method of claim 8, wherein the method of performing EB-PSNR for ensuring the quality of the compressed image comprises of:
    obtaining, by a canny edge detector, one or more edge images of an original texture and a reconstructed texture of the one or more compressed images;
    determining, peak signal-to-noise ratio (PSNR) of blocks by calculating a Sum Squared Error (SSE) after applying smoothening on the one or more edge images and reconstructed texture of the one or more compressed images;
    performing different levels of smoothening and SSE for each level is accumulated as a final average SSE,
    finding an edgePSNR block based on the one or more edge images, identified for blocks of the image along with a PSNR corresponding to each block;
    identifying an un-ideal edgePSNR block after finding the edge PSNR block for the plurality of blocks in the image;
    checking if the unideal edge PSNR is above a preset threshold PSNR or not.

12. The method of claim 8, wherein the edge images of original texture and reconstructed texture of the compressed image by a canny edge detector can be obtained from at least one of Red, Green, Blue (RGB) color space, HSV color space, YUV color space, LUV color space and YCrCb color space.

13. A computer program product comprising computer executable program code recorded on a non-transit computer readable storage medium, the computer executable program code comprising:
- detecting, by a processor, a texture upload call for a texture between a processor and a Graphical Processing Unit (GPU);
- performing a texture optimization technique on the texture to generate a low memory texture when a mobile device is in an idle mode, wherein the texture optimization technique is at least one of On Device Texture Compression (ODTC), Content Adaptive Compression (CAC) and Dynamic Texture Scaling (DTS); and
- replacing the original texture with the low memory texture to be sent to the GPU.

\* \* \* \* \*